(12) United States Patent
Swennen et al.

(10) Patent No.: US 9,284,666 B2
(45) Date of Patent: Mar. 15, 2016

(54) NETWORK LAYER WITH BIODEGRADABLE SUBSTANCE

(75) Inventors: Ives Jean Jenny Ghislain Swennen, Hansbeke (BE); Kris Luc Rob Coen, Lede (BE)

(73) Assignee: BONAR N.V., Zele (BE)

( * ) Notice: Subject to any disclaimer, the term of this patent is extended or adjusted under 35 U.S.C. 154(b) by 1238 days.

(21) Appl. No.: 13/062,317

(22) PCT Filed: Sep. 4, 2009

(86) PCT No.: PCT/EP2009/061483
§ 371 (c)(1),
(2), (4) Date: May 2, 2011

(87) PCT Pub. No.: WO2010/026227
PCT Pub. Date: Mar. 11, 2010

(65) Prior Publication Data
US 2011/0197508 A1    Aug. 18, 2011

(30) Foreign Application Priority Data
Sep. 5, 2008    (EP) ...................................... 08163783

(51) Int. Cl.
*D03D 15/00* (2006.01)
*A01G 13/00* (2006.01)
(Continued)

(52) U.S. Cl.
CPC ............ *D03D 15/00* (2013.01); *A01G 13/0268* (2013.01); *D03D 9/00* (2013.01); *D03D 15/0033* (2013.01); *D03D 15/0088* (2013.01);
(Continued)

(58) Field of Classification Search
CPC .............. A01G 13/02; A01G 13/0256; A01G 13/0268; A01G 13/0281; D03D 15/00; D03D 15/0033
USPC ............................ 47/9, 20.1, 31, 32, 58.1 SC
See application file for complete search history.

(56) References Cited

U.S. PATENT DOCUMENTS 4,266,370 A * 5/1981 Kodera et al. ................... 47/29.4
6,218,321 B1 * 4/2001 Lorcks et al. .................. 442/165
(Continued)

FOREIGN PATENT DOCUMENTS

EP    0799335 B1    9/1999
EP    1533114 A2    5/2005
(Continued)

OTHER PUBLICATIONS

Aug. 6, 2012 Notice of Opposition filed in Opposition Proceeding concerning European Patent No. EP 2 329 070 B1 (European Patent Application No. 09 811 133.9).
(Continued)

*Primary Examiner* — Monica Williams
(74) *Attorney, Agent, or Firm* — Oliff PLC

(57) ABSTRACT

A network layer is provided that contains at least one thermoplastic biodegradable substance. The network layer contains at least one colored first material in a first direction, the first colored material exhibiting a first absorption coefficient, and at least one colored second material in a second direction, the second colored material exhibiting a second absorption coefficient. The colored first material and the colored second material are in contact with each other, a coloration of the first material is different from a coloration of the second material, and the second absorption coefficient is different from the first absorption coefficient.

13 Claims, 4 Drawing Sheets

(51) Int. Cl.
*D03D 9/00* (2006.01)
*D03D 19/00* (2006.01)
*D04H 3/005* (2012.01)
*D04H 3/04* (2012.01)
*D04H 3/045* (2012.01)

(52) U.S. Cl.
CPC .............. *D03D19/00* (2013.01); *D04H 3/005* (2013.01); *D04H 3/04* (2013.01); *D04H 3/045* (2013.01); *D10B 2401/041* (2013.01); *D10B 2401/12* (2013.01); *D10B 2505/06* (2013.01); *D10B 2505/204* (2013.01); *Y10T 442/183* (2015.04); *Y10T 442/3033* (2015.04); *Y10T 442/3976* (2015.04); *Y10T 442/40* (2015.04)

(56) References Cited

U.S. PATENT DOCUMENTS

| | | | |
|---|---|---|---|
| 2005/0050793 A1* | 3/2005 | Johnson | C09K 17/52 47/9 |
| 2006/0021311 A1 | 2/2006 | Kim | |
| 2010/0248574 A1* | 9/2010 | King et al. | 442/205 |
| 2011/0197508 A1* | 8/2011 | Swennen et al. | 47/59 S |
| 2011/0314731 A1* | 12/2011 | Toye | A01G 13/0268 47/31 |

FOREIGN PATENT DOCUMENTS

| | | | | |
|---|---|---|---|---|
| EP | 1534059 A1 | 6/2005 | | |
| EP | 1867789 A1 * | 12/2007 | ............ | E02D 17/20 |
| GB | 2405414 A | 3/2005 | | |
| JP | A-06-070645 | 3/1994 | | |
| JP | A-07-150440 | 6/1995 | | |
| JP | A-09-107815 | 4/1997 | | |
| JP | 10266216 A * | 10/1998 | ............ | E02D 17/20 |
| JP | A-11-098926 | 4/1999 | | |
| JP | A-2001-352844 | 12/2001 | | |
| JP | A-2002-119146 | 4/2002 | | |
| JP | A-2006-325456 | 12/2006 | | |
| JP | 2007247113 A | 9/2007 | | |
| WO | WO 98/23817 A1 | 6/1998 | | |
| WO | WO 2009/000340 A1 | 12/2008 | | |

OTHER PUBLICATIONS

Mar. 21, 2013 Patentee Observations filed in Opposition Proceeding concerning European Patent No. EP 2 329 070 B1 (European Patent Application No. 09 811 133.9).

Jun. 21, 2013 Response to Patentee Observations filed in Opposition Proceeding concerning European Patent No. EP 2 329 070 B1 (European Patent Application No. 09 811 133.9).

* cited by examiner

NETWORK LAYER WITH BIODEGRADABLE SUBSTANCE

This is a national stage of PCT/EP09/061483 filed on Sep. 4, 2009 and published in English, which in turn claims priority of EP 08163783.7 filed on Sep. 5, 2008, the disclosures of which are hereby incorporated by reference herein in their entirety.

SUMMARY

The invention pertains to a network layer comprising at least one thermoplastic biodegradable substance, whereby the network layer exhibits at least one coloured first material in a first direction and at least one coloured second material in a second direction, whereby the coloured first material and the coloured second material are in contact with each other.

The network layer is preferably used in landscaping and horticulture as root growth barrier. This means the network layer is placed to prevent weed from growing while offering the optimal growing conditions for the plants being part of the landscape. So on the one hand light must be prevented to go through the network layer and on the other hand the temperature should not rise too high in order to provide a good environment for the growing plants.

In landscaping the use of biodegradable materials is important, although they are often temperature sensitive.

Thermoregulation of the network layer can overcome both issues stated above.

Textile products comprising biodegradable substances are well known in the prior art. Document EP 0 799 335 B1 discloses an article which comprises biodegradable fibers, whereby the fibers are made by starch-based biodegradable thermoplastic polymers. The polymer mixture could contain a natural dyestuff. Document EP 1 534 059 B1 discloses biodegradable fibers, whereby in one embodiment the fibers are made from polylactic acid. In this document Indigo can be used as preserving agent. Document US 2006/0257616 A1 discloses a renewable nonwoven carpet comprising a backing layer bonded to a face layer being biodegradable. The face layer is formed of a blend of different fiber types that are biodegradable and can be of different colours. Depending on how the fibers are blended and placed into the nonwoven web, various aesthetic effects can be attained.

Document WO 98/23817 A1 discloses a base layer for a combined synthetic and natural turf, of which at least a part of the weft and/or warp thread is manufactured from a biodegradable material. Synthetic grass fibers protrude from the fabric at locations where the series of non-degradable weft threads and non-degradable warp threads intersect. These synthetic grass fibers are made from polyolefin, polyamides or fibers of natural or non-natural material. Part of the synthetic grass fibers may have at least one colour other than green to form a pattern, such as lines of the playing field or a club logo.

Document EP 1 867 789 A1 discloses a biodegradable mesh consisting of a textile which textile comprises a plurality of yarns, staples or narrow fabrics obtained from fibers of paper or a non-woven cellulosic fabric. At least some of the yarns, staples or narrow fabrics can comprise dyed segments in order to define signs.

Document GB 2405414 A discloses a pile fabric comprising bamboo fiber. The fabric is preferably woven and the bamboo fiber may be in the pile loops and also be used in the ground fabric. The bamboo looped warp may have one or more colours for aesthetic effects, such as providing borders with fantasy illustrations.

Document US 2006/0021311 A1 discloses a two-dimensional leaf collection woven net including a woven mesh net formed of biodegradable fiber material. A colour is used to identify the moving part of the leaf collection net.

Regarding the prior art the different colours of the textile products are used mostly for aesthethical reasons or as an indication.

Further on, the temperature of the textile product could increase disadvantageously over the glass transition temperature, by what the textile product is damaged or even destroyed by shrinking.

It is a general object of this invention to provide a network layer comprising a biodegradable substance, which is more thermally stable in a large temperature range.

According to this invention this object is achieved by a network layer comprising at least one thermoplastic biodegradable substance, whereby the coloured first material and the coloured second material are in contact with each other and whereby the colouration of the first material and the colouration of the second material is different, characterized in that the first material exhibits a first absorption coefficient and the second material exhibits a second absorption coefficient, being different from the first absorption coefficient.

As will be outlined below, by providing a network layer according to the invention, it is possible to regulate the overall temperature of the network layer.

Due to the different colouration the first material is modified compared with the second material. This modification causes preferably that the physical properties of the first material are different from the physical properties of the second material.

Preferably the modification generates a different absorption coefficient in the first material and the second material. Especial preferred the coloured first material exhibits a first absorption coefficient and the coloured second material exhibits a second absorption coefficient, whereby the first and the second absorption coefficients are different form each other.

Absorption coefficient is dependent from the molar absorption coefficient $\epsilon$ and the concentration c of the absorbing substance. The molar absorption coefficient is wavelength dependent.

$$\alpha = \epsilon \cdot c$$

In this case there are at least two absorbing substances: the material on the one hand and the coloured substance on the other hand.

A black coloured object for example absorbs almost every incident visual sunlight (sunlight includes all fundamental colours) and hardly any visual light is reflected. Due to this effect the object looks black to a human viewer. A white coloured object reflects all incident visual sunlight and less visual light is absorbed. Therefore the white coloured object looks white to a human viewer. A coloured object however, which absorbs radiation—for example in form of sunlight—heats up and the temperature of the object increases. A coloured object, which absorbs much radiation, usually exhibits therefore a higher temperature than a coloured object, which absorbs less radiation. If the network layer is radiated, for example with sunlight, due to the different absorption coefficient the first material absorbs and reflects different wavelengths and amounts of sunlight (radiation) than the second material. Therefore, the first material and the second material heat up in different ways. As a result, it could be that the temperature of the first material is much higher than the temperature of the second material and by this the first material shrinks much more than the second material despite utilisation of the same substance for the first and the second material. Due to the fact, that the first material is in physical contact with the second material the overall temperature of the network layer will be between the temperature of the first material and the temperature of the second material.

For the sake of clarity the first material and the second material exhibit different temperature although the first and the second material were irradiated with the same radiation, the same power and the same period.

The first material and the second material are in contact with each other, preferably in physical contact with each other. The term "physical contact" refers to a robust connection between the first material and the second material. Such a physical contact is given in a woven fabric, whereby one material is arranged in the weft direction and the other material is arranged in the warp direction. Further such physical contact is given in a knitted fabric due to the stitches For better understanding it is also possible that the colouring itself influences the chemical properties of the first and second material. Through this the first and the second material preferably exhibit different heat abstractions, heat conductivities and/or different shrinking rates. Therefore, the properties of the first material and the second material depend on the used colourants.

The term "Network" refers to a woven or knitted layer. In a preferred embodiment the network layer is a woven fabric, whereby the first direction is the warp direction and the second direction is the weft direction.

Preferably, the colouration is the same along the entire length of a warp and/or a weft yarn, resulting in a network having a colouration in warp direction and a different colouration in weft direction.

Alternatively, also yarns with different colouration in warp direction and/or weft direction can be present.

Preferably the coloured first material and/or the coloured second material comprise(s) at least one thermoplastic biodegradable substance. The term "biodegradable substance" refers to natural or synthetic degradable polymer. Preferably, a biodegradable plastic can be used as biodegradable substance. Suitable biodegradable plastics can be divided into some large groups such as microorganism-producing system, natural substance-utilizing system, and chemically synthesized system, and aliphatic polyester system, denatured polyvinyl alcohol system, denatured starch system and other systems. Especially preferred are the first material and/or the second material being completely or nearly completely a biodegradable substance. Particularly preferred is a network layer consisting entirely of a thermoplastic biodegradable substance.

In one preferred embodiment the at least one biodegradable substance comprises polylactic acid and especially preferred consists of polylactic acid (PLA). Polylactic acid has a melting temperature of about 150° C. and a glass transition temperature of about 55° C. In another preferred embodiment the biodegradable substance is polybutylene succinate, polyhydroxybutyrate, polyhydroxyalkanoates aliphatic copolyesters or poly caprolactons. A biodegradable substance composed of a combination of the above named substances is also possible. Furthermore, it is possible that the first material comprises a first biodegradable substance and the second material comprises a second biodegradable substance, whereby the first biodegradable substance is different from the second biodegradable substance.

It is preferred that the coloured first material and/or the coloured second material exist in the network layer as strips, tapes, fibers and/or filaments.

"Strips are preferably developed by cutting a foil into strips. Cutting a fabric into tapes preferably can form tapes. It is also conceivable to develop strips by extruding rectangular shaped monofilaments, for example in an extruding process."

The term "fiber" refers to single or a plurality of multifilament fibers like yarn. In one preferred embodiment the network layer is consisting of multifilament fibers or filaments arranged in two directions. In another preferred embodiment the network layer is consisting of strips, whereby the strips are woven into a woven fabric.

Preferably the colour of the first material and/or the colour of the second material is brown, blue, green, red, black and/or white. For the sake of clarity in this invention black and white should also considered as colour. Among the mentioned colours any colourfulness, chroma and saturation are possible. Furthermore, the term "colourant" refers to a dye and/or a pigment. Examples for preferred various coloured combinations of the first material and the second material are green and black, brown and black and black and white.

A further object of the invention is a method for producing a network layer as described above comprising at least the steps:
  extruding a thermoplastic biodegradable polymer to obtain a first and/or a second material;
  colouring the first material and/or the second material and arranging the first and the second material in a network to obtain a network layer, wherein the colouration of the first material and the second material is different.

In one preferred embodiment the biodegradable polymer is present as melt, which is commonly known as melt spinning. Alternatively the biodegradable polymer is dissolved in a solvent and spun by solution spinning, whereby the spun polymer is collected in a coagulation bath.

To obtain a coloured first and second material one or a plurality of coloured melt streams can be used. The melt or the dissolved polymer can be coloured during the extruding or the first and second material can be coloured before/during or after extruding. In one preferred embodiment the biodegradable polymer is extruded as a foil. Preferably two different coloured melt streams are used to produce two differently coloured foils or to produce two differently coloured rectangularly monofilaments. The two differently coloured foils or the two differently coloured monofilaments represent the first and the second coloured material. It is understood, that the foil can also be coloured after the foil is extruded and before the foil is cut into strips, tapes, fibers and/or filaments. Alternatively the foil is cut into strips, tapes, fibers and/or filaments and then the strips, tapes, fibers and/or filaments are coloured.

An extrusion process in this invention is a process, in which a substance changes the shape. In a spinning process a substance is pressed across a spinning nozzle, whereby the shape of the spinning nozzle is variable.

It is preferred that foils are extruded and then cut into strips, whereby a first amount of coloured strips represents the coloured first material and a second amount of coloured strips represents the coloured second material. In another preferred embodiment different coloured melts are extruded into rectangular shaped monofilaments, whereby every monofilament is one strip.

Preferably the first material is arranged in a first direction and the second material is arranged in a second direction to obtain a network. The first direction and the second direction are preferably perpendicular, parallel or in an angle to each other.

Preferably the first and the second material are stretched with a draw ratio of at least 2-10 prior arranging the first and the second material to obtain the network. Another possibility is that the first and the second material are arranged in a network and then the network is stretched. Due to the stretching the strength of the first material and the second material increases. Therefore, the strength of the network increases and the area of applications for the network extends.

Preferably the network layer can be used in landscaping and horticulture and/or as packaging material or for completely biodegradable scrims or fabrics. In the landscaping and horticulture application the network layer is preferably used as root growth barrier.

When used as landscaping material the combination of a light and a dark colour is important for the following reason. The dark colour, preferably black, prevents the light from coming through the network layer. This way the growth of unwanted weed is avoided. The light colour, preferably white, results in a higher reflection of the sunlight and will cool down the soil beneath the network layer, resulting in a more ideal surroundings for the wanted plants growing through the network layer. Instead of white, green and brown are often used to mimic the surroundings.

The invention may best be understood by reference to the following drawings. The following figures are intended to describe certain embodiments of the present invention and should not be interpreted in any manner as limiting the scope of the invention as set forth in the accompanying claims.

DETAILED DESCRIPTION

Figure 1:
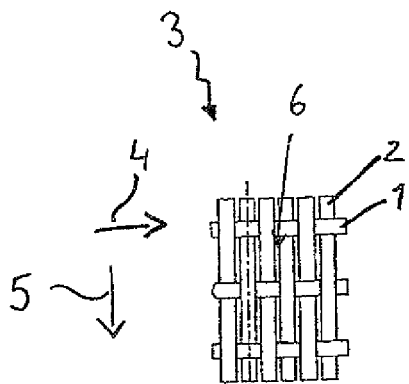
FIG. 1 shows a woven fabric as network layer.

In FIG. 1 one embodiment for a network layer 3 is demonstrated. The network layer 3 exhibits a first material 1 in a first direction 4 and a second material 2 in a second direction 5. In this embodiment the first and second material 1, 2 are strips. Due to the woven structure of the network layer 3 between the first material 1 and the second material are gaps 6. The gaps 6 ensure a good irrigation of plants, so that the network layer can be used for landscaping and horticulture. The first material 1 is coloured in a first colour and the second material 2 is coloured in a (different) second colour. Preferably the absorption coefficient of the first material 1 and the absorption coefficient of the second material 2 change due to the different colouration. If the first material 1 is coloured in black for example and the second material 2 is coloured in green and the network layer is irradiated by sunlight, than the absorption coefficient of the first material 1 is much higher than the absorption coefficient of the second material 2. Therefore, the first material 1 warms up more than the second material 2 and the temperature inside the first material 1 is much higher than inside the second material 2. For a simple network layer 3 construction, both the first material 1 and the second material 2, are made of the same biodegradable substance and the chemical properties of the materials 1, 2 are not altered by the colouration. The colouration for the first material 1 and the second material 2 can further be selected such, that the outward appearance of the network layer is adapted to the application for the network layer 3. For an application in the landscaping and horticulture for example, the network layer 3 looks like soil or soil with plants. Advantageously the network layer 3 assimilates with the background and is invisible to a viewer. A lower overall temperature of the network layer 3 is additional to this suitable for weed control, herbicide reduction and improve the water retention of the soil due to the cover. Further on, due to the different coloured material the overall temperature of the network layer 3 can be influenced by selecting the different colouration and/or by changing the ratio between the first material 1 and the second material 2. In a woven fabric for example could be the ratio between first material 1 and second material 2 1:2 or 1:4. Due to the ratio and the different colouration the overall temperature of the network layer 3 can vary.

Figure 2:
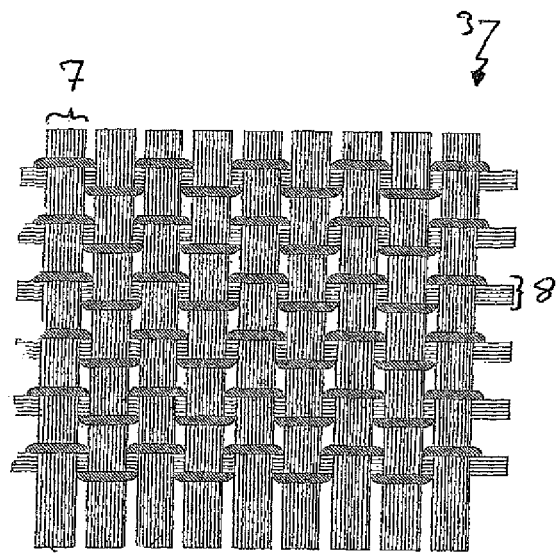
FIG. 2 shows a woven fabric, whereby the woven fabric exhibits yarn.

In FIG. 2 an alternative network layer 3 is shown. This network layer 3 consists of single fibers, whereby always a group of fibers 7, arranged in the second direction 5, is fixed with fibers 8 arranged in the first direction 4. Preferably the colouration of the group of fibers 7 in the second direction 5 is different to the colouration of the fibers 8 in the first direction 4. Alternatively the colouration of adjacent fibers is different.

Figure 3:
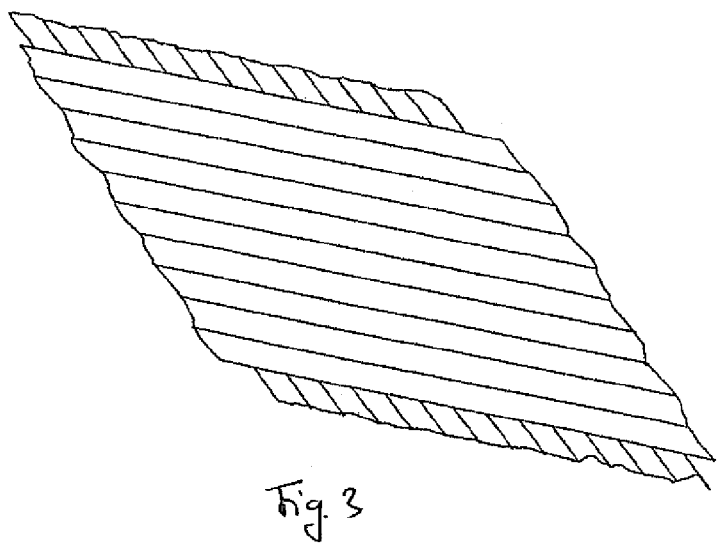
FIG. 3 shows a network layer consisting of strips.

In FIG. 3 another alternative for a network layer 3 is shown. In this embodiment the network layer 2 exhibits two plies of tapes, whereby the plies of tapes are perpendicular arranged to each other. The tapes are preferably arranged with a gap between adjacent tapes in every ply. Preferably an adhesive is used to fixes the two plies together.

Figure 4:
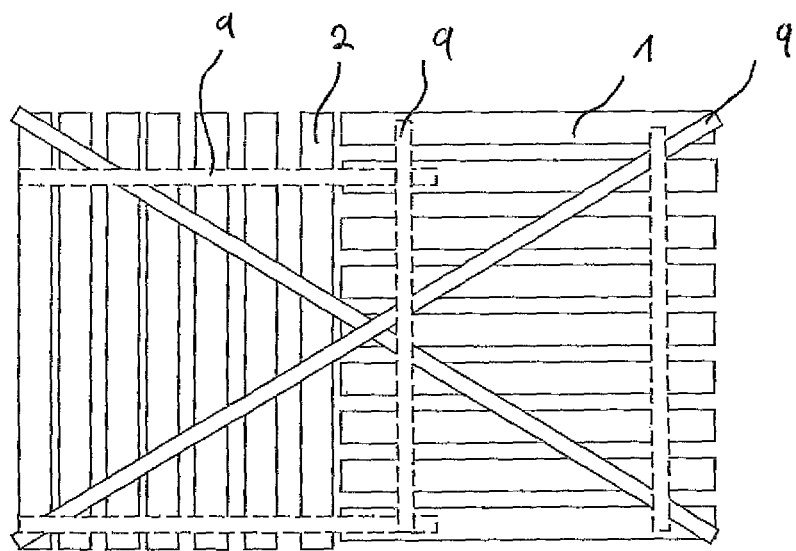
FIG. 4 shows an alternative network with strips.

FIG. 4 shows an alternative network layer 3, whereby strips as first material 1 and second material 2 are used. The strips of the first material 1 are arranged parallel to each other and perpendicular to the strips of the second material 2. The strips of the second material 2 are also arranged parallel to each other. The first material 1 and the second material 2 are connected together by fixing strips 9.

Figure 5:
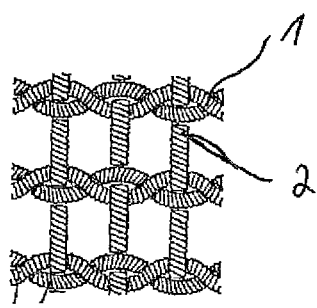
FIG. 5 shows a knitted network layer.

FIG. 5 shows a knitted fabric as network layer 3, whereby the first material 1 and the second material 2 are used as yarn.

Figure 6:
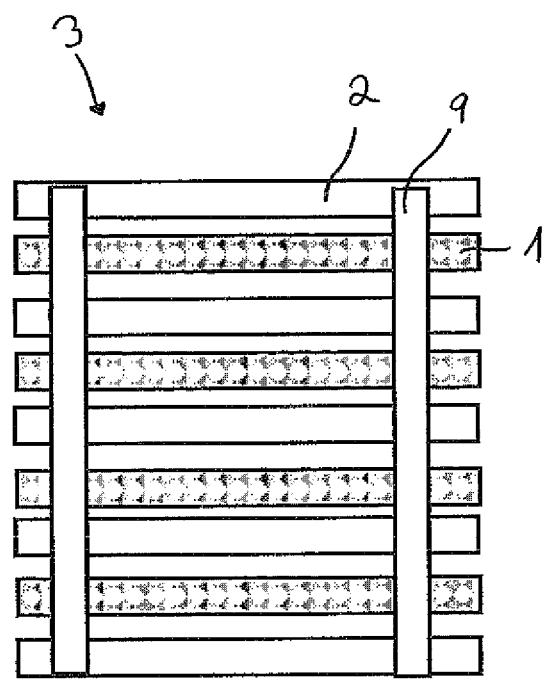
FIG. 6 shows a network layer with parallel-arranged strips.

In FIG. 6 an example for a network layer 3 with a parallel-arranged first and second material 1, 2 is shown. Perpendicular to the first and second material 1, 2 fixing strips 9 are arranged, whereby the first material 1 and the second material 2 are connected by the fixing strips 9.

Figure 7:
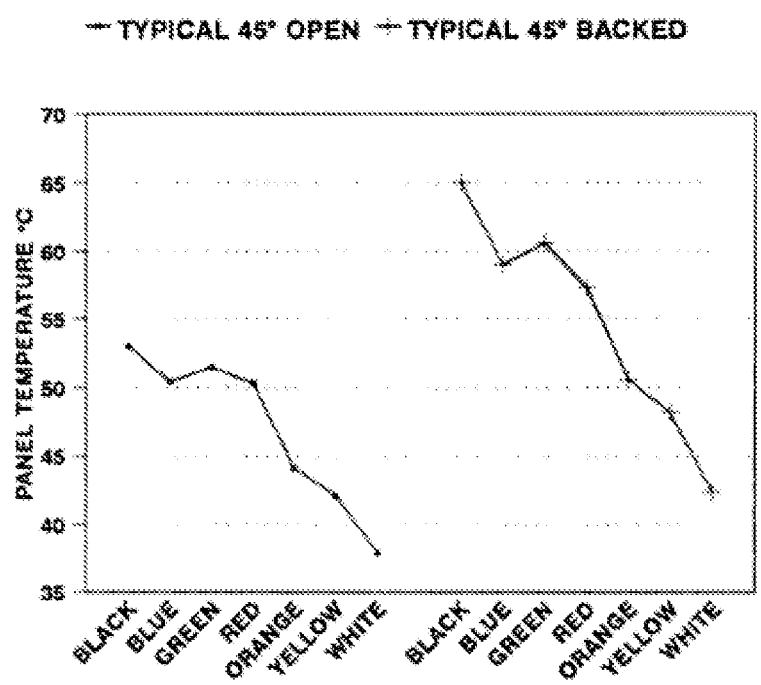
FIG. 7 shows the difference in temperature of objects with different colours when irradiated.

FIG. 7 represents a graph that shows the difference in temperature of objects with different colours when irradiated. The object in this case is under an angle of 45° and a distinction is made between no backing behind the object and placing a backing behind the object (which is like placing it on the ground).

REFERENCE NUMBERS 1 first material
2 second material
3 network layer
4 first direction
5 second direction
6 gap(s)
7 group of fibers
8 fiber(s)
9 fixing strip(s)

EXAMPLES

The invention is further elucidated by the following examples. It goes without saying that these examples should not be interpreted in any manner as limiting the scope of the invention as set forth in the accompanying claims. In the examples reference is made to black and white as colours in the network layer. The skilled man is able to select and adapt the colours actually used for a specific purpose by referring to the graph in FIG. 7.

Example 1

A biodegradable network layer is produced consisting only of PLA tapes. PLA tapes are coloured with a black pigment showing a certain molar absorption coefficient $\epsilon_b$. The black pigment is added with a concentration $c_1$. The temperature of the network layer is $T_1$.

Example 2

A biodegradable network layer is produced consisting only of PLA tapes. PLA tapes are coloured with a black pigment showing a certain molar absorption coefficient $\epsilon_b$. The black pigment is added with a concentration $c_2$ (being higher than $c_1$). The temperature of the network layer is $T_2$, being remarkably higher than $T_1$.

Example 3

A biodegradable network layer is produced consisting only of PLA tapes. PLA tapes are coloured with a white pigment showing a certain molar absorption coefficient $\epsilon_{wh}$. The white pigment is added with a concentration $c_1$. The temperature of the network layer is $T_3$, being remarkably lower than $T_1$.

Example 4

A biodegradable network layer is produced consisting only of PLA tapes. Half of the PLA tapes is coloured with a white pigment ($\epsilon_{wh}$, $c_1$), the other half is coloured with a black pigment ($\epsilon_b$, $c_1$). The overall temperature of the network layer is $T_4$, situated between $T_1$ and $T_3$.

Example 5

A biodegradable network layer is produced consisting only of polybutylene succinate. Half of the polybutylene succinate tapes is coloured with a white pigment ($\epsilon_{wh}$, $c_1$), the other half is coloured with a black pigment ($\epsilon_b$, $c_1$). The overall temperature of the network layer is $T_5$, being different from $T_4$.

Example 6

A biodegradable network layer is produced consisting only of PLA tapes. 75% of the tapes is coloured with a white pigment ($\epsilon_{wh}$, $c_1$), 25% of the tapes is coloured with a black pigment ($\epsilon_b$, $c_1$). The overall temperature of the network layer is $T_6$, being lower than $T_4$ but higher than $T_3$.

It is clear that by varying the colour of the tapes and the ratio of the tapes with different colours the overall temperature of the network layer can be regulated. This way it can be avoided that the temperature rises higher than the glass transition temperature of the material, which may cause severe changes or damage to the material.

The invention claimed is:

1. A network layer for use in landscaping or horticulture, the network layer comprising:
   at least one thermoplastic biodegradable coloured first material exhibiting a first absorption coefficient, the coloured first material consisting of warp yarns in a warp direction, each warp yarn having a colouration that is the same along the entire length of the warp yarn and each warp yarn extending the entire length of the network layer; and
   at least one thermoplastic biodegradable coloured second material exhibiting a second absorption coefficient, the coloured second material consisting of weft yarns in a weft direction, each weft yarn having a colouration that is the same along the entire length of the weft yarn and each weft yarn extending the entire length of the network layer,
   wherein:
   the entire network layer is a woven layer of the warp yarns and the weft yarns,
   the coloured first material and the coloured second material are in contact with each other,
   a colouration of the coloured first material is different from a colouration of the coloured second material, and
   the second absorption coefficient is different from the first absorption coefficient.

2. The network layer according to claim 1, wherein the network layer consists of a thermoplastic biodegradable substance.

3. The network layer according to claim 2, wherein the thermoplastic biodegradable substance comprises polylactic acid.

4. The network layer according to claim 1, wherein the coloured first material and/or the coloured second material exist(s) in the network layer in a form selected from the group consisting of strips, tapes, fibers, filaments, and combinations thereof.

5. The network layer according to claim 1, wherein at least one of the coloured first material and the coloured second material is coloured in at least one colour selected from the group consisting of green, brown, blue, red, black and white.

6. A method for producing the network layer according to claim 1, comprising: extruding a thermoplastic biodegradable polymer to obtain the first material and the second material; colouring the first material and/or the second material; and then arranging the first material and the second material in a network to obtain the network layer of claim 1.

7. The method according to claim 6, wherein the arranging of the first material and the second material in the network comprises arranging the first material in a warp direction and the second material in a weft direction.

8. The method according to claim 6, further comprising:
   prior to arranging the first material and the second material in the network, stretching the first material and the second material with a draw of at least 2-10.

9. A method for regulating plant growth, comprising:
   placing the network layer according to claim 1 in landscaping so that an amount of light and a temperature of the network layer are maintained at optimum levels for growing plants.

10. A root growth barrier comprising the network layer according to claim 1.

11. The network layer according to claim 1, wherein a temperature of the network layer when exposed to light is no higher than a glass transition temperature of the network layer.

12. The network layer according to claim 1, wherein at least one of the colouration of the coloured first material and the colouration of the coloured second material is a dark colour, and at least one of the colouration of the coloured first material and the colouration of the coloured second material is a light colour.

13. A network layer for use in landscaping or horticulture, the network layer comprising:

at least one thermoplastic biodegradable coloured first material exhibiting a first absorption coefficient, the coloured first material consisting of warp yarns in a warp direction, each warp yarn having a colouration that is the same along the entire length of the warp yarn; and at least one thermoplastic biodegradable coloured second material exhibiting a second absorption coefficient, the coloured second material consisting of weft yarns in a weft direction, each weft yarn having a colouration that is the same along the entire length of the weft yarn, wherein:

the network layer is a woven layer of the warp yarns and the weft yarns, the coloured first material and the coloured second material are in contact with each other, a colouration of the coloured first material is different from a colouration of the coloured second material, the second absorption coefficient is different from the first absorption coefficient, and the colourations of all the warp yarns are the same, and the colourations of all the weft yarns are the same.

* * * * *